Patented Apr. 21, 1931

1,802,191

UNITED STATES PATENT OFFICE

JAMES A. WRIGHT, OF MONTREAL, QUEBEC, CANADA

MOTOR VEHICLE WITH FRONT-WHEEL DRIVE

Application filed February 17, 1928. Serial No. 255,143.

This invention relates to motor vehicles and particularly to those with transverse spring suspension having a front wheel drive.

The object of the invention is to provide a car of small size, light weight and short wheel base, having individual wheel suspension and a front wheel drive.

A further object is to provide a car of small size but so constructed as to give the maximum passenger accommodation and foot room.

A further object is to provide a car of simple, durable and economical construction and providing comfortable accommodation and smooth running, which can be sold at a low price and thereby supply a cheaper means of transport than has hitherto been available.

The invention consists in a frame comprising channelled side members having raised front and rear extension portions, main channelled cross members, the forward member carrying the power plant and spring suspension, the rear member carrying the spring suspension, central tubular cross members and cross members to the extension portions of the side members. The motor which is of the radial type and is air cooled, is secured with its fly wheel and clutch housing to the rear of the front main cross member of the frame, while the casing housing the transmission and differential mechanism is secured to the front side of this cross member. Brackets at the sides of this cross member provide seats for the forward transverse springs, which are mounted thereon to incline forwardly and whose ends are coupled to ball joints on the wheel carriers on which the wheels are journalled.

The stub shafts of the differential have brake drums keyed thereto and have Cardan shafts coupling them with the wheel hubs.

The rear main cross member of the frame has a central bracket providing seats for the upper and lower rear transverse springs, which are coupled at their ends to rear wheel carriers of a novel design on which the rear wheels are journalled.

The floor of the car body is on the level of the lower flange of the side frame members. The tubular cross members pass beneath the front seat, while the rear seat is supported on the cross members and the rear extension portion of the frame, beneath which the fuel tank is suspended.

Reference is made to the accompanying drawings, in which:—

Figure 1:
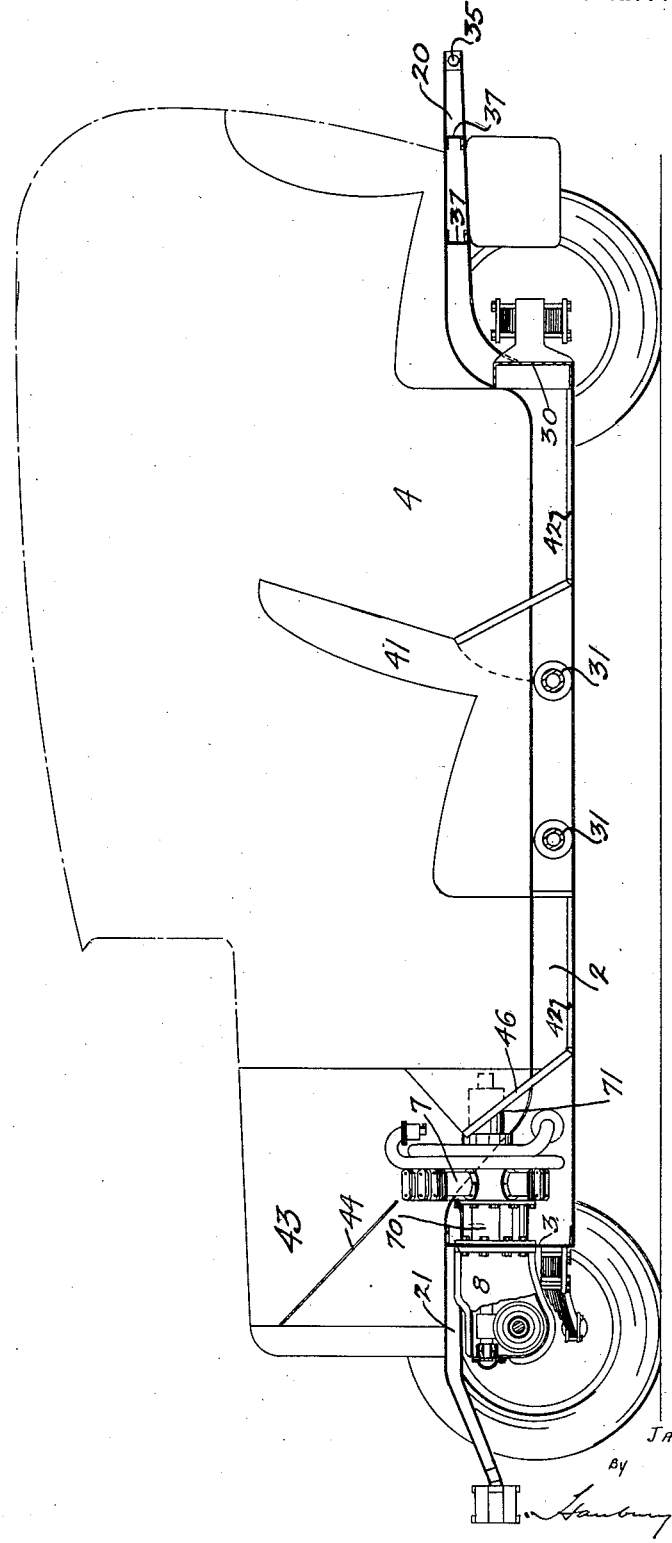
Figure 1 is a vertical sectional view.

The frame is composed of side channels 2—2, which spread towards the rear, connected at the front by a main cross channel 3, and at the rear by a main cross channel 30, with the intermediate cross tubes 31, 31. Forward side extension channel portions 21, 21, of the frame have a cross member 36, at their front ends. Rearward side extension channel portions 20, 20, of the frame have a cross tubular member 35, and intermediate cross channels 37, 37.

Figure 2:
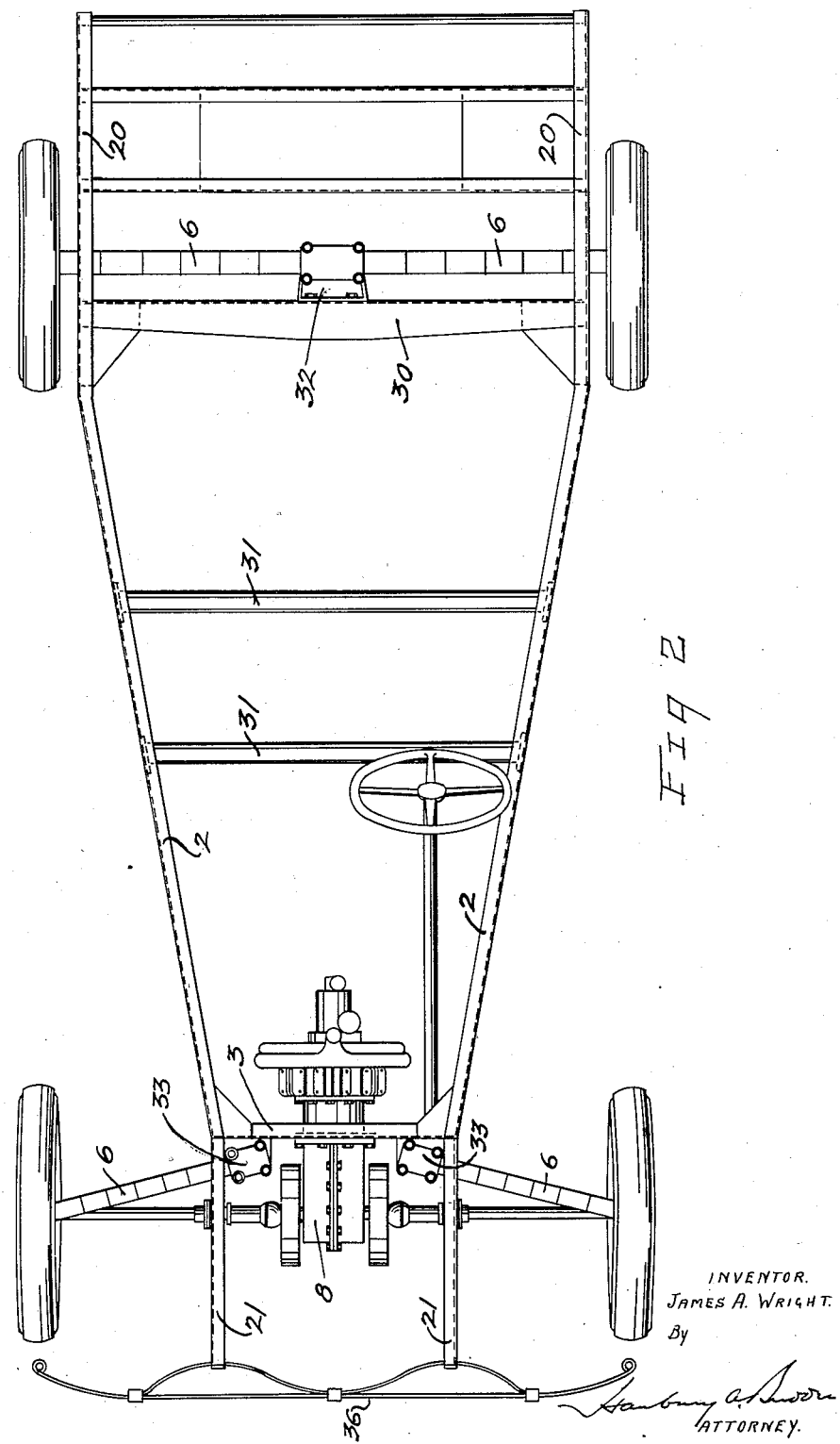
Figure 2 is a plan view of the chassis and power plant.
Figure 3:
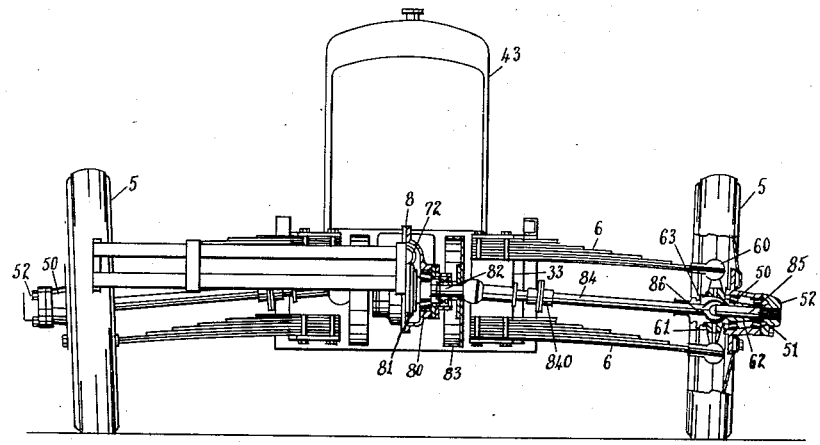
Figure 3 is a front view, one half in vertical section.

The main front cross channel 3, has side brackets 33, providing seats for the front transverse springs 6, 6, which are of the cantilever type, two of which are mounted on each bracket 33, and are forwardly inclined as shown in Figure 2.

Figure 4:
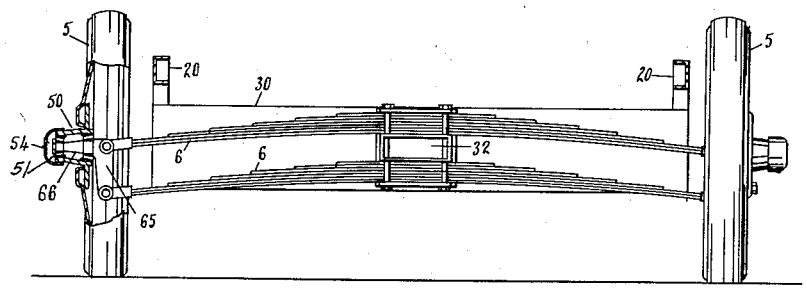
Figure 4 is a rear view of the rear suspension partly cut away.

The rear cross channel 30, has a bracket 32, centrally mounted on its main rear side, on which the rear transverse springs 6, 6, are seated as shown in Figure 4.

The front wheels 5, 5, have sleeve hubs 50, journalled on bearings 51, mounted on sleeves 62, extending outwards from the wheel carriers 61. Ball sockets 60, extend above and below the wheel carrier 61, to which the ends of the springs 6, 6, are coupled.

The wheel carriers 61, have central spherical recesses between the ball sockets 60, to be referred to hereinafter. They also have flexible inner caps 63.

The rear wheels 5, 5, have sleeve hubs 50, journalled on bearings 51, mounted on stub axles 66, forming part of bell cranks 65, on which the ends of the rear springs 6, 6, are pivoted as shown in Figure 4.

The engine 7, which is of the radial type, is bolted to a casing 70, in which the fly wheel and clutch are housed. This casing 70, is bolted to the rear side of the main front cross channel 3. The differential casing 8, which is vertically split as shown in Figure 2, is bolted to the front side of the cross channel 3, by the same bolts that secure the casing 70.

This casing 8, houses the differential gear 81, the overhung worm drive 72, and the transmission mechanism and has side bearings 80, in which the stub shafts 82, of the differential 81, are journalled.

Brake drums 83, are mounted on the stub shafts 82, outside the bearings 80. Cardan shafts 84, connect the drive stub shafts 82, to the driven stub shafts 85, which are splined in the wheel caps 52, of the wheel hub 50. The outer universal joint of the Cardan shaft 84, occupies the spherical recess in the center of the wheel carrier 61, and the flexible cap 63, encloses the outer end of the Cardan shaft 84, to provide protection from dust and dirt. The Cardan shaft 84, may be provided with a coupling 840, for the purpose of readily dismounting the drive mechanism.

The generator 71, projects from the rear side of the engine 7, and is suitably encased in the middle of the foot board 46.

The car body 4, is directly supported on the frame and its extensions. The hood 43, contains an inclined baffle 44, to direct the air entering the front of the hood to the radial engine 7, to provide air cooling.

The rear seat 40, which is supported on the extension sides 20, 20, and the cross members 30, and 37, provides very wide and low accommodation. The front seat 41, which is supported on the side members 2, 2, occupies the space above the tubular cross members 31, 31.

The floor 42, is supported on the lower flanges of the side members 2, 2, and provides ample and low foot room.

The gas tank is supported by the cross members 37, 37.

With a construction such as is set forth above, a car of the minimum dimensions is provided having the maximum accommodation. Its weight is reduced and its low center of gravity give many advantages in operation and in safety.

The radial engine and front wheel drive together with transverse spring suspension provide inexpensive transportation with the maximum comfort and smooth running.

The inclined position of the front springs assists in absorbing road shocks.

The motive parts are readily and easily dismounted.

The balanced suspension of the motor and drive mechanism relieve the frame of stresses liable to cause distortion.

What I claim is:—

1. In a motor vehicle, a frame comprising side channel members spreading rearwards, front and rear cross channel members, intermediate cross tubular members, and forward and rearward extensions, having transverse spring suspension, a car body supported on the frame, seats supported on the side frame members and a floor supported on the lower flange of the side frame members.

2. In a motor vehicle, a frame having channel side and end members, a power plant and drive mechanism mounted in balanced suspension on the front cross channel member, with transverse springs coupled to wheel bearing members and wheels journalled thereon.

3. In a motor vehicle, a frame having channel side and end members, mounted on transverse springs, the front cross channel member supporting in rear, a gas engine, flywheel and clutch and in front, a transmission casing, a differential casing, stub shafts journalled in the sides thereof and brake drums mounted on the stub shafts, forming a balanced power and drive mechanism.

4. In a motor vehicle having a front wheel drive, a frame having a front cross channel member with a power plant mounted on the rear side of such member, and transmission and differential mechanism housed in a casing mounted on the front side of the cross member.

5. In a motor vehicle, a front wheel drive mechanism comprising a power plant including engine, flywheel and clutch mounted on the rear side of a cross channel member of the frame, and a casing housing the transmission and differential mechanism mounted on the front side of the cross member, brake drums mounted on the stub shafts of the differential which are journalled in the sides of the casing, and Cardan shafts connecting the stub shafts to the hubs of the wheels.

6. In a motor vehicle a frame comprising side and end channel members, with front and rear extensions thereto, and a car body supported on the frame, having the rear seat directly supported on the side and cross channel members of the frame.

7. In a motor vehicle, a frame comprising side channel members spreading rearwardly and front and rear main cross channel members, brackets thereon, transverse springs seated in the brackets, a front wheel drive mechanism horizontally mounted on and through the front main cross member in balanced suspension, wheels journalled on wheel carriers coupled to the ends of the transverse springs and flexible drive means to the front wheels.

8. In a motor vehicle, a frame having channel side and main front and rear cross members, mounted on transverse springs the ends of which are coupled to wheel carriers on which the wheels are journalled, and a front wheel drive mechanism horizontally mounted on and through the front main cross member in balanced suspension and having a flexible independent drive to the wheels.

JAMES A. WRIGHT.